(12) United States Patent
Maekawa et al.

(10) Patent No.: US 10,007,003 B2
(45) Date of Patent: Jun. 26, 2018

(54) RADIATION MONITOR AND HAND-FOOT-AND-CLOTH MONITOR

(71) Applicant: FUJI ELECTRIC CO., LTD., Kawasaki-shi (JP)

(72) Inventors: Osamu Maekawa, Tachikawa (JP); Shinji Oyama, Mitaka (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 174 days.

(21) Appl. No.: 15/069,904

(22) Filed: Mar. 14, 2016

(65) Prior Publication Data

US 2017/0010365 A1    Jan. 12, 2017

(30) Foreign Application Priority Data

Jul. 9, 2015  (JP) .................. 2015-137911

(51) Int. Cl.
*G01T 1/167*      (2006.01)
(52) U.S. Cl.
CPC ..................... *G01T 1/167* (2013.01)
(58) Field of Classification Search
CPC ...................................................... G01T 1/167
See application file for complete search history.

(56) References Cited

U.S. PATENT DOCUMENTS

2013/0206997 A1    8/2013 Hashimoto et al.

FOREIGN PATENT DOCUMENTS

| JP | H07-12946 A | 1/1995 |
| JP | 2003-167059 A | 6/2003 |
| JP | 5201269 B2 | 6/2013 |

*Primary Examiner* — David Porta
*Assistant Examiner* — Mindy Vu
(74) *Attorney, Agent, or Firm* — Rabin & Berdo, P.C.

(57) ABSTRACT

Accurate radioactive surface contamination measurement, regardless of the size of the hand of the subject, is obtained with a radiation monitor having a hand monitoring section including a first detecting unit that may be fixed and a second detecting unit that may be movable arranged opposite one another, an insertion opening connected to an insertion space defined between the units into which the hand is inserted, and a displacing mechanism that displaces the first detecting unit and the second detecting unit relatively to each other into closer proximity upon insertion of the hand. The hand monitoring section detects radioactive rays emitted from radioactive materials attracted to the hand of the subject with one of the palm of the hand or the back of the hand being made to face the fixed detecting unit side and the other being made to face the movable detecting unit side.

18 Claims, 11 Drawing Sheets

RADIATION MONITOR AND HAND-FOOT-AND-CLOTH MONITOR

CROSS-REFERENCE TO RELATED APPLICATION(S)

This non-provisional Application for a U.S. Patent claims the benefit of priority of JP PA 2015-137911 filed Jul. 9, 2015, the entire contents of which is hereby incorporated by reference.

BACKGROUND OF THE INVENTION

1. Field of the Invention

The present invention relates to a radiation monitor which measures the surfaces of the hands of a subject for surface contamination by radioactive materials attracted thereto and a hand-foot-and-cloth monitor.

2. Background of the Related Art

A hand-foot-and-cloth monitor has been known which is a device installed in such a facility as a nuclear power station or a hospital where radioactive materials are handled and measures the surfaces of the hands and feet and the cloth of a worker in the facility as a subject for surface contamination by radioactive materials attracted thereto. The hand-foot-and-cloth monitor measures the amounts of radioactive rays emitted from radioactive materials to sound an alarm and, along with this, show contaminated parts on a liquid crystal display when a measured value exceeds an alarm level.

In such a hand-foot-and-cloth monitor, radioactive rays emitted from the radioactive materials attracted to the hands of a subject are measured by a hand monitoring section. The hand monitoring section is provided with a pair of hand inserting sections into which the right and left hands of the subject are inserted, respectively. Each of the hand inserting sections is formed between opposing side surfaces on each of which a radiation detecting section is provided. The level of surface contamination on each of the left and right hands of the subject can be obtained by measuring the doses of radioactive rays emitted from the radioactive materials attracted to the surface of each of the palm and the back of the left hand of the subject and the doses of radioactive rays emitted from the radioactive materials attracted to the surface of each of the palm and the back of the right hand with the subject inserting the left and right hands into their respective hand inserting sections while opening the left and right hands (see JP-A-2003-167059 (Patent Document 1), for example).

However, in a related hand monitoring section, the width of the hand inserting section is made fixed to the maximum value of the size (thickness) of the hand of a conceivable subject. This caused a problem of making the measuring accuracy different depending on the hand size. Namely, α-rays as one type of radioactive rays to be measured, because of the short ranges thereof in air, caused the following problem. When the size of the hands of the subject is large, both of the palm and the back of the hand come close to their respective radiation detecting sections to provide high measuring accuracy. When the size of the hands of the subject is small, however, the palm or the back of the hand is apart from the radiation detecting section to result in low measuring accuracy.

The invention was made in view of the foregoing with an object of providing a radiation monitor and a hand-foot-and-cloth monitor which can accurately measure surface contamination regardless of the sizes of hands of a subject.

SUMMARY OF THE INVENTION

The radiation monitor according to the invention is a radiation monitor including a first detecting unit detecting radioactive rays, a second detecting unit detecting radioactive rays while being arranged oppositely to the first detecting unit and a displacing mechanism connected to the first detecting unit and the second detecting unit, in which the first detecting unit and second detecting unit form between them an insertion opening and an insertion space to the insertion opening into which the hand of a subject is inserted and the displacing mechanism displaces the first detecting unit and the second detecting unit relatively to each other when the subject inserts the hand thereof into the insertion space from the insertion opening, and detecting radioactive rays emitted from radioactive materials attracted to the hand of the subject with one of the palm and the back of the hand being made to face the first detecting unit side and the other being made to face the second detecting unit side. The radiation monitor is characterized by further including at least one energizing element that energizes the first detecting unit and second detecting unit in the direction to make them relatively come close to each other.

According to the radiation monitor, by keeping the width of the insertion space being set small, the first detecting unit and second detecting unit are relatively displaced to each other so as to enlarge the insertion space against the force of the energizing element when the subject inserts the hands thereof into the insertion openings for detecting radioactive rays. In other words, the first detecting unit can be pressed against one of the palm and back of the hand inserted into the insertion opening and the second detecting unit can be pressed against the other by the energizing element, by which enhanced tightness can be provided in the intimate contact between the hand and each of the detecting units. As a result, regardless of the sizes of hands of subjects, the first detecting unit and second detecting unit can be arranged close to any of the palm and the back of the hand to the size of the hand of the subject, by which even when radioactive rays emitted from contamination are α rays with short ranges, accurate measurement of the contamination becomes possible.

The hand-foot-and-cloth monitor according to the invention is characterized by including a hand monitor section having the foregoing radiation monitor, a foot monitor section detecting the surface contamination of the foot of the subject, and a cloth monitor section detecting the surface contamination of the cloth of the subject.

According to the invention, a radiation monitor and a hand-foot-and-cloth monitor can be provided which can accurately measure surface contamination regardless of the sizes of hands of a subject.

DESCRIPTION OF THE PREFERRED EMBODIMENT

In the following, an embodiment of the invention will be explained in detail with reference to attached drawings. In the embodiment, in addition to a radiation monitor to be a hand monitoring section, a hand-foot-and-cloth monitor will be explained which is provided with a foot monitoring section and a cloth monitoring section. However, the invention can be applied to a radiation measuring device provided with no foot monitoring section and no cloth monitoring section.

Figure 1:
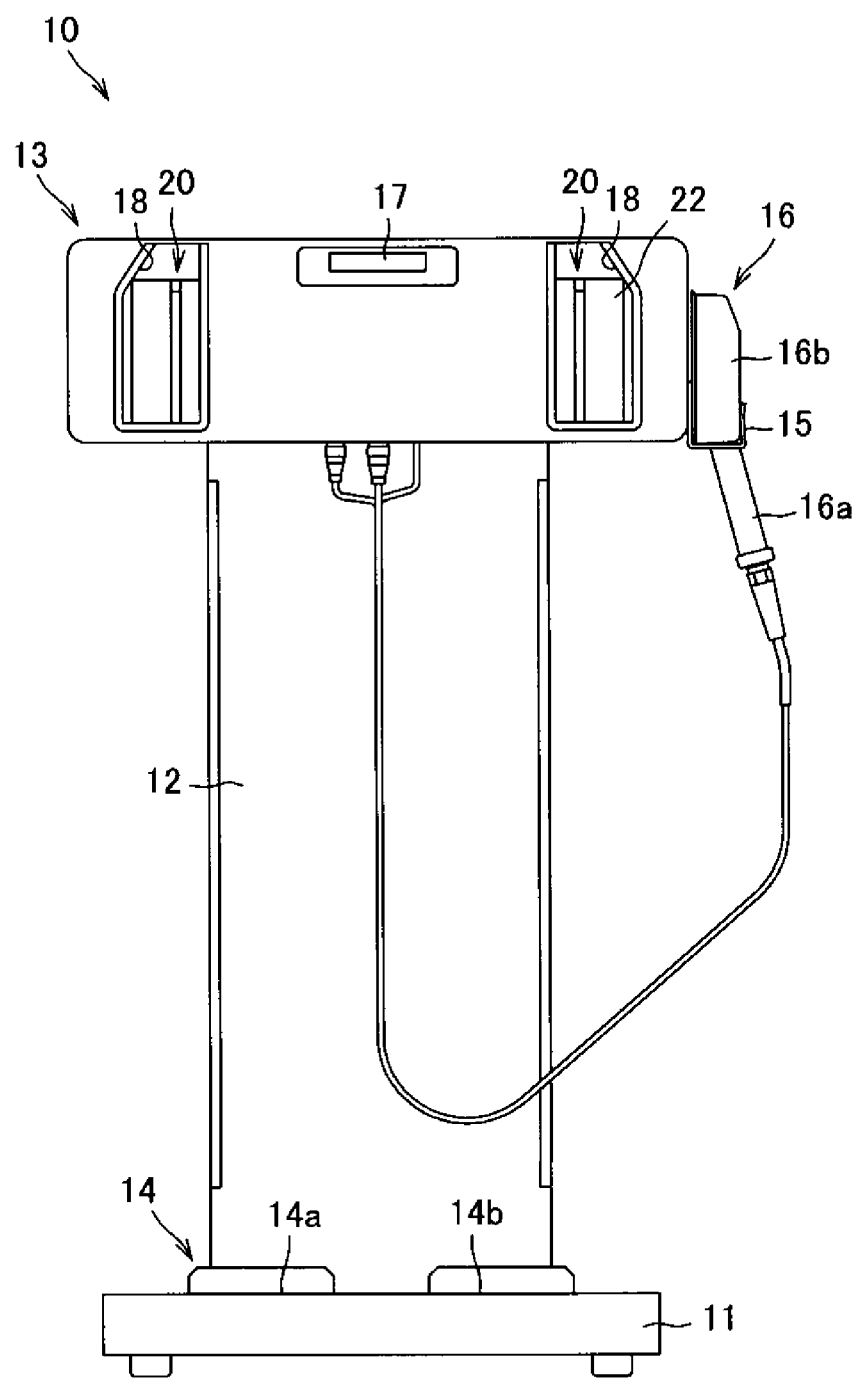
FIG. 1 is a front view showing a hand-foot-and-cloth monitor provided with a radiation monitor according to an embodiment of the invention.
Figure 2:
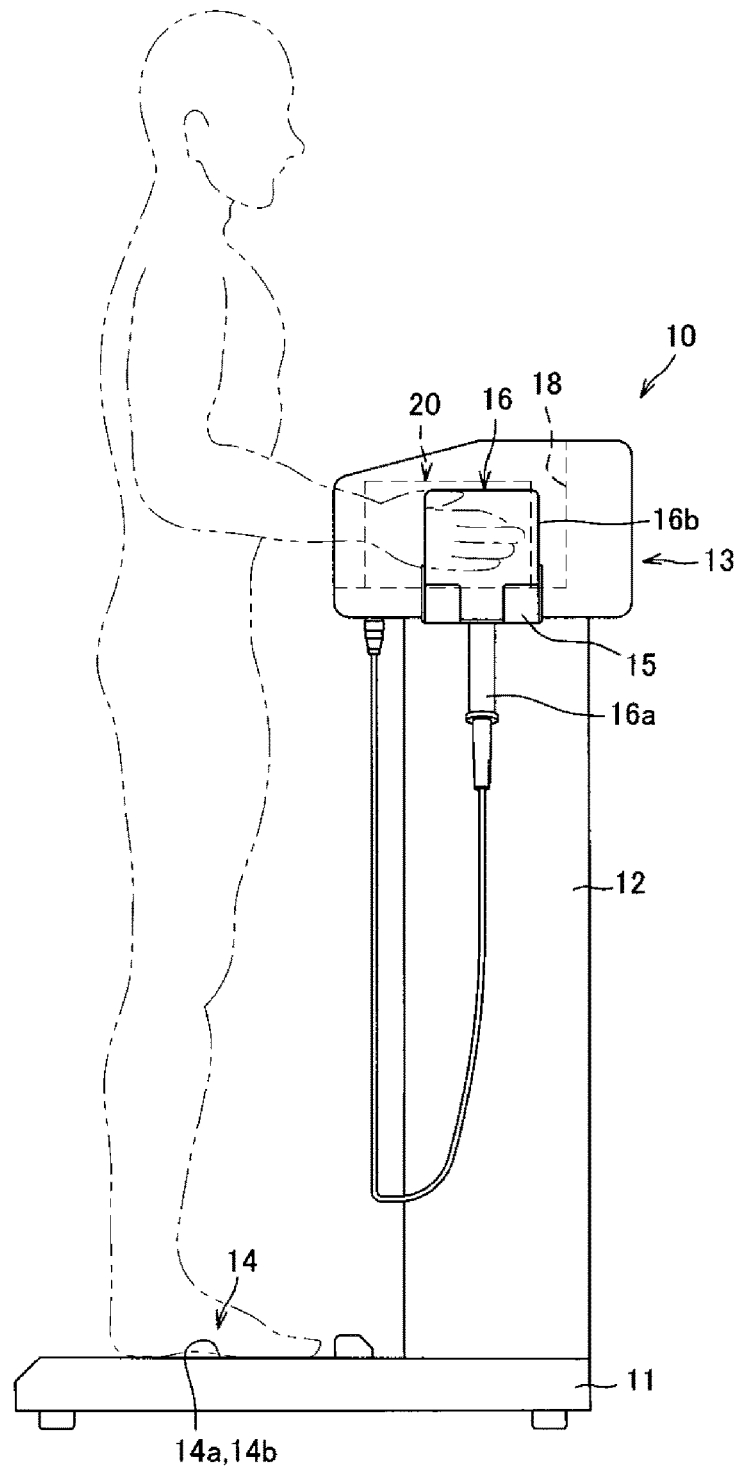
FIG. 2 is a right-hand side view showing the hand-foot-and-cloth monitor in a service condition.

FIG. 1 is a front view showing a hand-foot-and-cloth monitor provided with a radiation monitor according to the embodiment of the invention and FIG. 2 is a right-hand side view showing the hand-foot-and-cloth monitor in a service condition. As is shown in FIG. 1 and FIG. 2, the hand-foot-and-cloth monitor designated by reference numeral 10 is provided with a base 11 as a step for a subject, a support 12 in a box-shape provided so as to stand up at the back of the upper surface of the base 11 and an upper unit 13 secured onto the upper end of the support 12.

The base 11 is provided with a foot monitoring section 14 on the upper side thereof to be a step section. The foot monitoring section 14 is provided with a pair of a left side radiation detecting section 14a and a right side radiation detection section 14b at positions on which the left and right feet of the subject are placed, respectively. The left side radiation detecting section 14a and right side radiation detection section 14b detect radioactive rays (α-rays, β-rays and γ-rays) emitted from radioactive materials attracted to the surfaces of the left and right feet, respectively, of the subject, by which the radioactive surface contamination of the feet is detected.

On one of the side surfaces of the upper unit 13, a cloth monitoring section 16 is provided which is held by a hook 15 so as to be detachable from and attachable to the upper unit 13. The cloth monitoring section 16 is provided with a handle 16a for the subject carrying the cloth monitoring section 16 with one of the hands thereof and a radiation detecting section 16b mounted at the top of the handle 16a. The radiation detecting section 16b detects radioactive rays (α-rays, β-rays and γ-rays) emitted from radioactive materials attracted to the surface of the cloth of the subject, by which the radioactive surface contamination of the cloth is detected.

The upper unit 13 is provided with a display 17 (not shown in FIG. 2) in the central section on the upper surface thereof for displaying the results of radiation measurement on every part of the subject. In the upper unit 13, a pair of a left side compartment 18a and a right side compartment 18b are provided with the display 17 positioned between them. Each of the left side compartment 18a and right side compartment 18b is formed so as to have an opening on the front side, so that the subject can insert the left hand and right hand thereof into the left side compartment 18a and right side compartment 18b, respectively. In addition, inside the left side compartment 18a and right side compartment 18b, a hand monitoring section (a radiation monitor) 20a and hand monitoring section 20b detecting the surface contamination on the left and right hands of the subject, respectively, are provided so that a part of each of them is exposed.

The vertical position of the upper unit 13 is determined at the height at which the subject, while standing upright on the foot monitoring section 14, can insert the opened left and right hands thereof into the left side compartment 18a and the right side compartment 18b, respectively, with the arms thereof being bent, the little fingers thereof on the underside, and thumbs thereof on the upper side.

Figure 3:
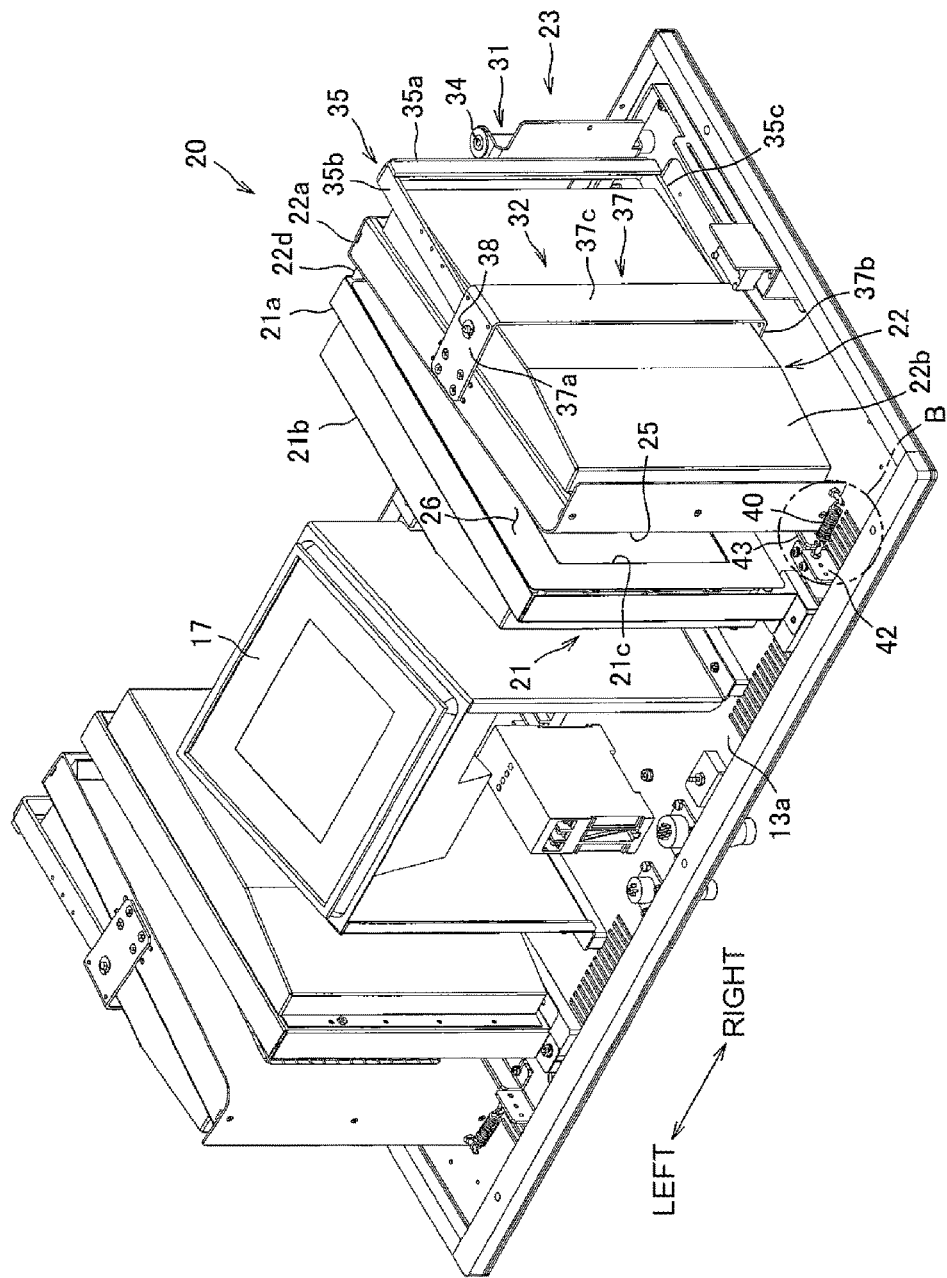
FIG. 3 is a perspective view showing hand monitoring sections and the peripheral structures thereof viewed from the front side.
Figure 4:
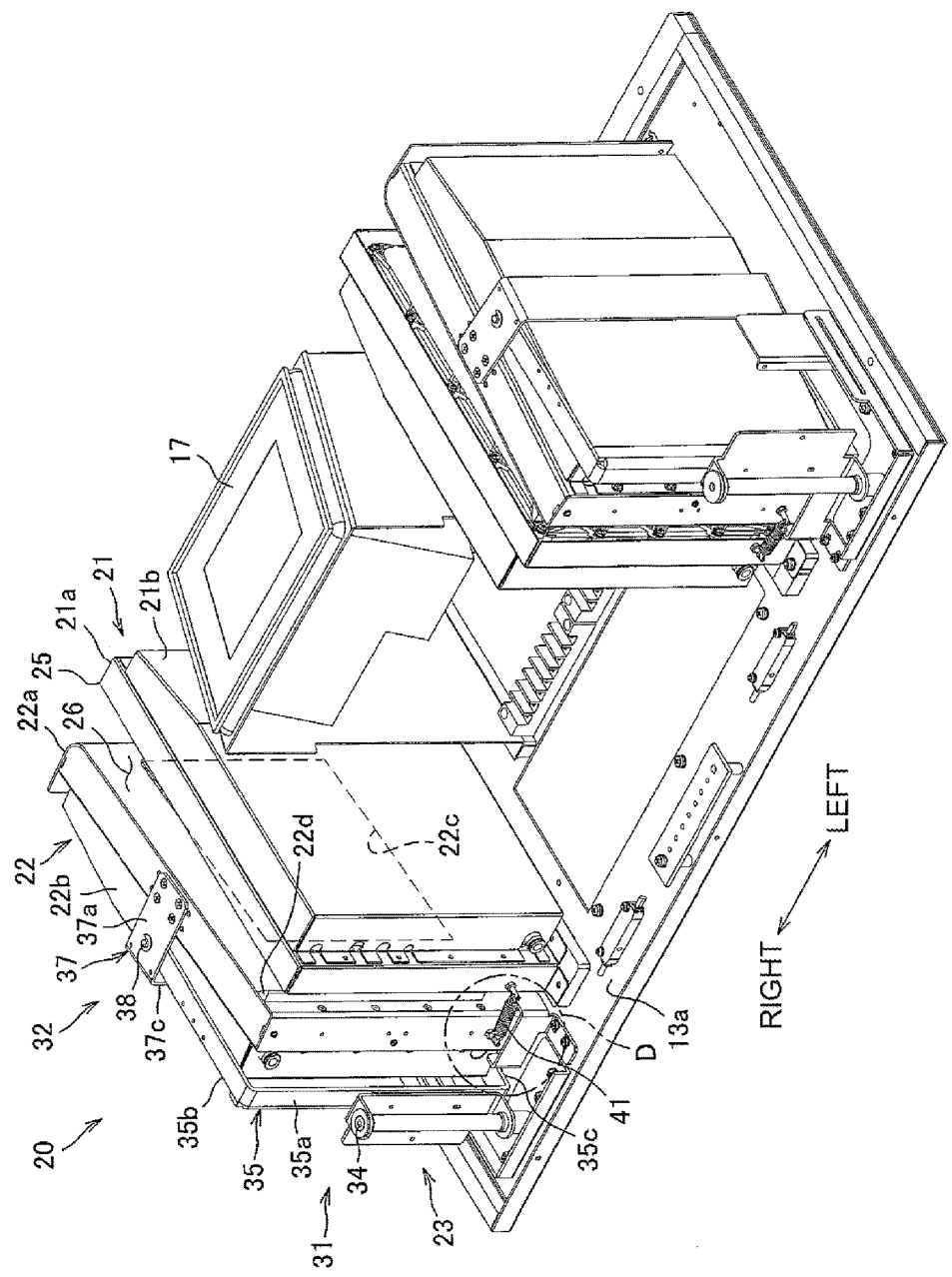
FIG. 4 is a perspective view showing the hand monitoring sections and the peripheral structures thereof viewed from the back side.
Figure 5:
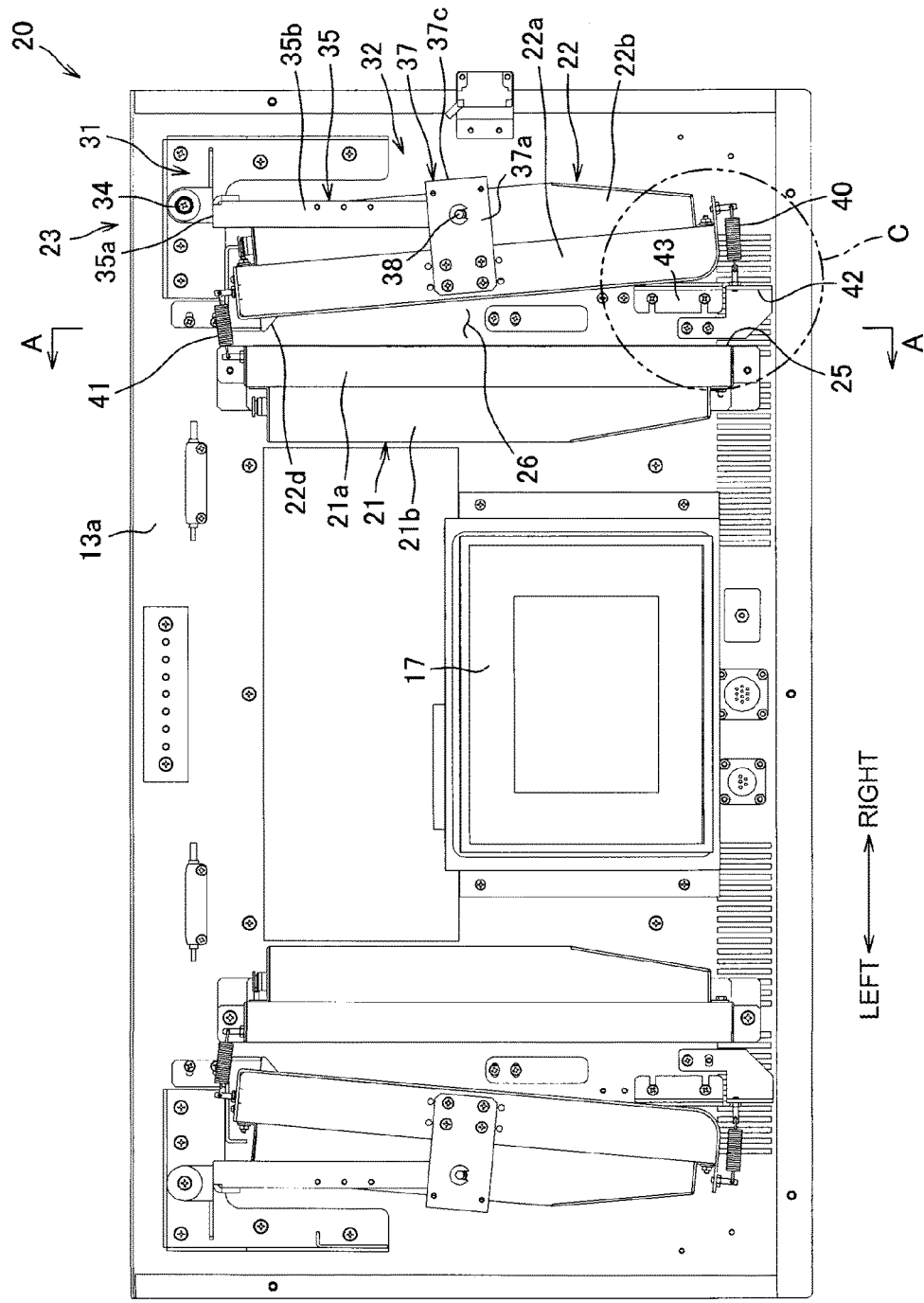
FIG. 5 is a plan view showing the hand monitoring sections and the peripheral structures thereof.

Next to this, the structure of the hand monitoring sections 20a and 20b according to the invention will be explained with reference to FIGS. 3 to 5. FIG. 3 to FIG. 5 show the hand monitoring sections 20a and 20b and peripheral structures thereof formed inside the upper unit 13. FIG. 3 is a perspective view showing the hand monitoring sections 20a and 20b and the peripheral structures thereof viewed from the front side, FIG. 4 is a perspective view showing the hand monitoring sections 20a and 20b and the peripheral structures thereof viewed from the back side and FIG. 5 is a plan view showing the hand monitoring sections 20a and 20b and the peripheral structures thereof.

As is shown in FIGS. 3 to 5, the hand monitoring sections 20a and 20b are formed so as to be laterally symmetrical to the display 17 at the center for measuring radioactive rays from both of the left and right hands. Therefore, in the following, the hand monitoring section 20a and 20b will be explained with respect to only the structure of the hand monitoring section 20b for the right hand measurement and the explanations of the structure of the hand monitoring section 20a for the left hand measurement and the method of the left hand measurement with the use of the structure will be omitted. Therefore, the hand monitoring section 20b is hereinafter referred to as the hand monitoring section 20.

The hand monitoring section 20 is provided with a fixed detecting unit 21 as a first detecting unit and a movable detecting unit 22 as a second detecting unit oppositely arranged to the fixed detecting unit 21. The fixed detecting unit 21 is immovably mounted on a base 13a of the upper unit 13 (not shown) by means of screws. While, the movable detecting unit 22 is movably provided on the base 13a by means of a displacing mechanism 23. The fixed detecting unit 21 is arranged in the vicinity of the right side of the display 17 and the movable detecting unit 22 is arranged on the right side of the fixed detecting unit 21 with a specified spacing apart therefrom. The movable detecting unit 22 is arranged diagonally to the fixed detecting unit 21 so that the specified spacing becomes narrow on the back side of the hand monitoring section 20 and becomes the widest on the front side, by which the subject is allowed to easily insert the hand thereof from the front side to the back side. Here, the fixed detecting unit 21 and the movable detecting unit 22 provide the section between the front ends thereof as an insertion opening 25 into which the hand of the subject is inserted. In addition, the fixed detecting unit 21 and movable detecting unit 22 form the space between them as an insertion space 26 to the insertion opening 25.

Figure 6:
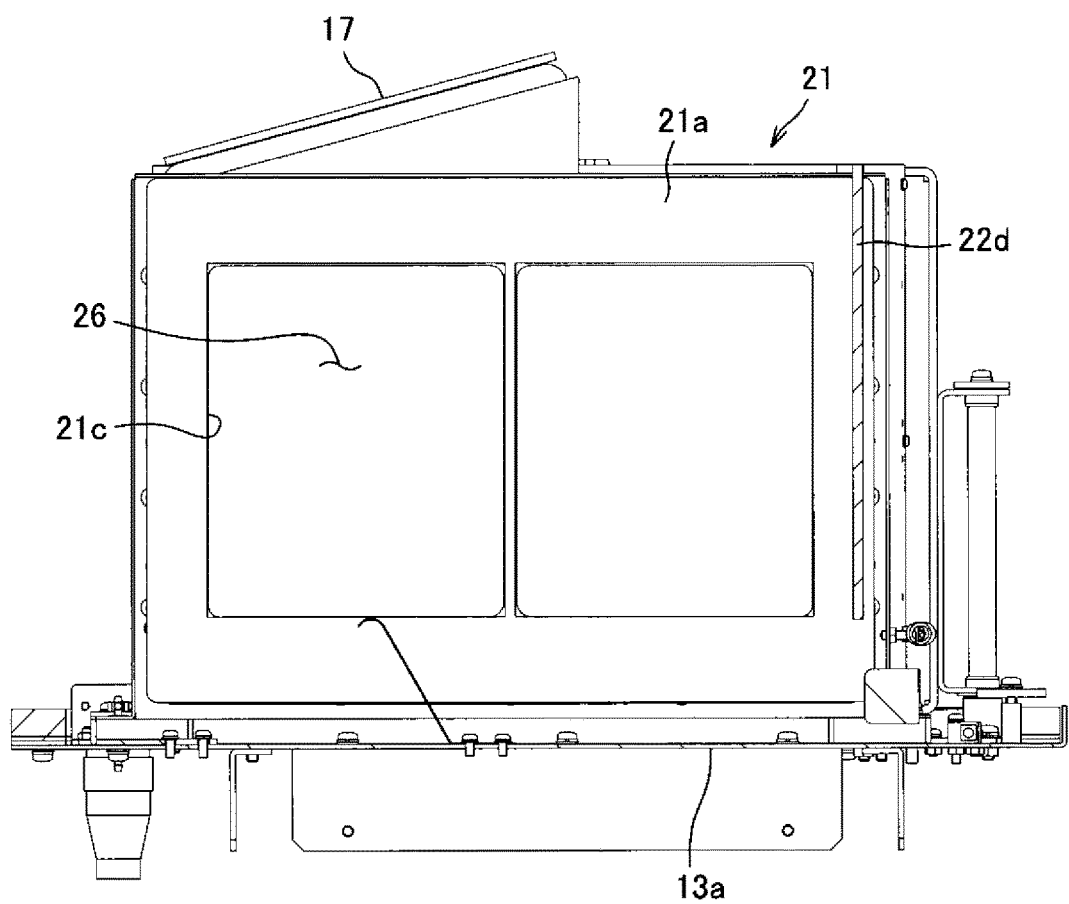
FIG. 6 is a cross sectional view taken in the direction of the arrows along the line A-A in FIG. 5.

The fixed detecting unit 21 is provided with a case 21a and a cover 21b. The case 21a is formed in box-like with the right side surface (inner surface) thereof becoming a vertical surface standing in the direction from the front to the back and with the left side thereof becoming an opening. The cover 21b is provided so as to block the opening of the case 21a. FIG. 6 is a cross sectional view taken in the direction of the arrows along the line A-A in FIG. 5. As is shown in FIG. 6, the case 21a has a detection window 21c on the right side surface (inner surface) thereof. The detection window 21c is formed so as to be opened onto the insertion space 26 side. The detection window 21c is provided for radiation detection by a radiation detector that will be explained later and is formed within a range corresponding to a hand to be inserted into the insertion space 26. The detection window 21c is provided with a protecting means such as a mesh (not shown) so as to protect the radiation detector.

Return to FIGS. 3 to 5. The movable detecting unit 22 has a structure similar to the structure in which the fixed detecting unit 21 is made to be laterally symmetrical thereto. This will be explained to make sure of this. The movable detecting unit 22 is provided with a case 22a and a cover 22b. The case 22a is formed in box-like with the right side thereof becoming an opening. The cover 22b is provided so as to block the opening of the case 22a. The left side surface (inner surface) of the case 22a becomes a vertical surface standing so as to increase the distance from the fixed detecting unit 21 toward the front side. The case 22a has a detection window 22c (shown in FIG. 4 only) on the left side surface thereof. The detection window 22c is formed so as to be opened onto the insertion space 26 side like the detection window 21c (see FIG. 6) in the fixed detecting unit 21. On the back side on the left side surface of the case 22a, a stopper 22d is provided. With the fingertip of the subject coming into contact with the stopper 22d, further insertion of the hand is prevented.

Each of the fixed detecting unit 21 formed of the case 21a and cover 21b and the movable detecting unit 22 formed of the case 22a and cover 22b contains a radiation detector, piping, wiring and printed circuit boards (not shown) disposed therein. For the radiation detector, in addition to a detector having a gas flow proportional counter applied thereto, a semiconductor detector and a plastic scintillation detector can be used, for example. By using such radiation detectors, radioactive rays emitted from radioactive materials attracted to the surfaces of the hands of the subject are detected, by which surface contamination on hand sections is detected.

The displacing mechanism 23 is provided with a first displacing unit 31 extending from the back of the movable detecting unit 22 toward the front (from the back side to the front side) and a second displacing unit 32 connecting the first displacing unit 31 and the movable detecting unit 22. The first displacing unit 31 and the second displacing unit 32 are connected so as to be relatively displaceable to each other to make the movable detecting unit 22 displaceable to the fixed detecting unit 21.

The first displacing unit 31 is provided with a shaft-like rotation support 34 standing from the base 13a behind the movable detecting unit 22 and a frame 35 that is rotatable with the center of the shaft of the rotation support 34 made as the center of rotation. The frame 35 is provided with a rear frame section 35a supported by the rotation support 34 so as to be relatively rotatable thereto and a top frame section 35b and a bottom frame section 35c (shown in only FIG. 3) extending forward from the top side and the bottom side of the rear frame section 35a, respectively. The front end side of each of the top frame section 35b and the bottom frame section 35c is coupled to the second displacing unit 32, by which the second displacing unit 32 becomes displaceable leftward and rightward when the frame 35 is rotated.

The second displacing unit 32 is provided with a bracket 37 fixed to the movable detecting unit 22 and a top and bottom pair of coupling units 38 (no bottom coupling unit is shown) which couple the top frame section 35b and the bottom frame section 35c, respectively, to the bracket 37 with the relative rotation between the bracket 37 and both of the top frame section 35b and the bottom frame section 35c being made possible.

The bracket 37 is provided with a top surface section 37a fixed to the top surface of the case 22a of the movable detecting unit 22, a bottom surface section 37b (shown in only FIG. 3) fixed to the bottom surface of the case 22a and a side surface section 37c provided between the right end of the top surface section 37a and the right end of the bottom surface section 37b continuously thereto. The top surface section 37a and bottom surface section 37b are secured to the case 22a at the middle position in the direction from the front to the back thereof. Each of a pair of the coupling units 38 is formed of an element such as a pin provided with a safety lock etc. One of the coupling units 38 is provided across the top surface section 37a and the top frame section 35b. Moreover, the other one of the coupling units 38 is provided across the bottom surface section 37b and the bottom frame section 35c. The bracket 37 and movable detecting unit 22 rotated with the coupling units 38 centered are to change the lateral width of the insertion opening 25 and the angle which the detection window 22c of the movable detecting unit 22 forms with the detection window 21c of the fixed detecting unit 21.

Here, on the front side becoming the insertion opening 25 side of the movable detecting unit 22, a front coil spring 40 (an energizing element not shown in FIG. 4) is provided and, on the back side becoming the opposite side of the insertion opening 25 in the movable detecting unit 22, a rear coil spring 41 (an energizing element not shown in FIG. 3) is provided.

Figure 7:
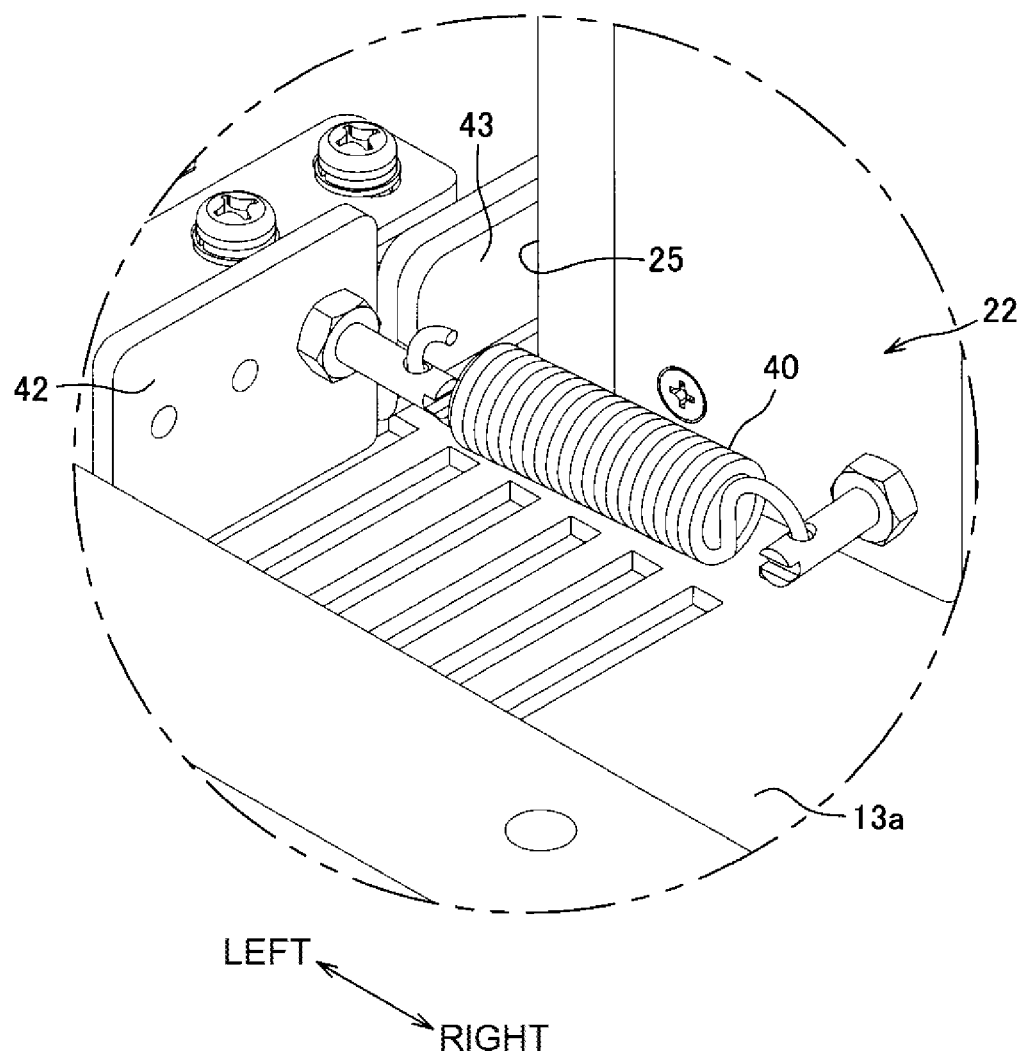
FIG. 7 is an enlarged view of the section B in FIG. 3.
Figure 8:
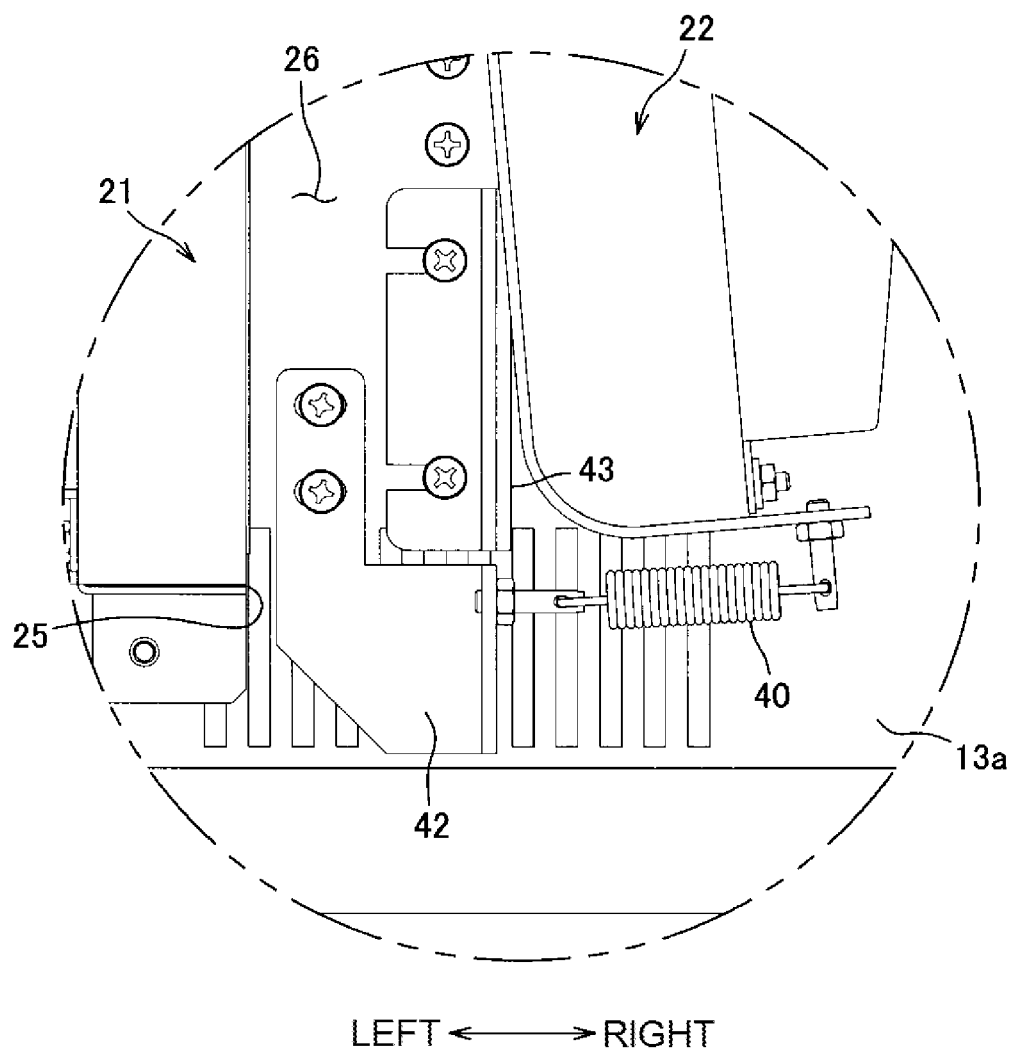
FIG. 8 is an enlarged view of the section C in FIG. 5.

FIG. 7 is an enlarged view of the section B in FIG. 3 and FIG. 8 is an enlarged view of the section C in FIG. 5. As is shown in FIG. 5, FIG. 6, FIG. 7 and FIG. 8, the one end (right end) side of the front coil spring 40 is connected to the front end side of the movable detecting unit 22 as a movable end. While, the other end (left end) side of the front coil spring 40 is connected to a support 42 on the base 13a as a fixed end. The front coil spring 40 exhibits a force pulling the front end of the movable detecting unit 22 in such a direction as to come close to the fixed detecting unit 21, i.e. leftward. This applies a force to the movable detecting unit 22 for rotatively displacing the movable detecting unit 22 clockwise in FIG. 5 to result in a state in which the movable detecting unit 22 is energized in the direction to narrow the lateral width of the insertion opening 25. Here, at the position next to the support 42 on the base 13a, a limiter 43 is provided which is in contact with the left side surface of the movable detecting unit 22. By the limiter 43 being in contact with the movable detecting unit 22, the clockwise rotation of the movable detecting unit 22 from the position shown in FIG. 5 and FIG. 8 is restricted, by which the lateral width of the insertion opening 25 is kept constant in the initial state (stand-by state before measurement) shown in FIG. 5.

Figure 9:
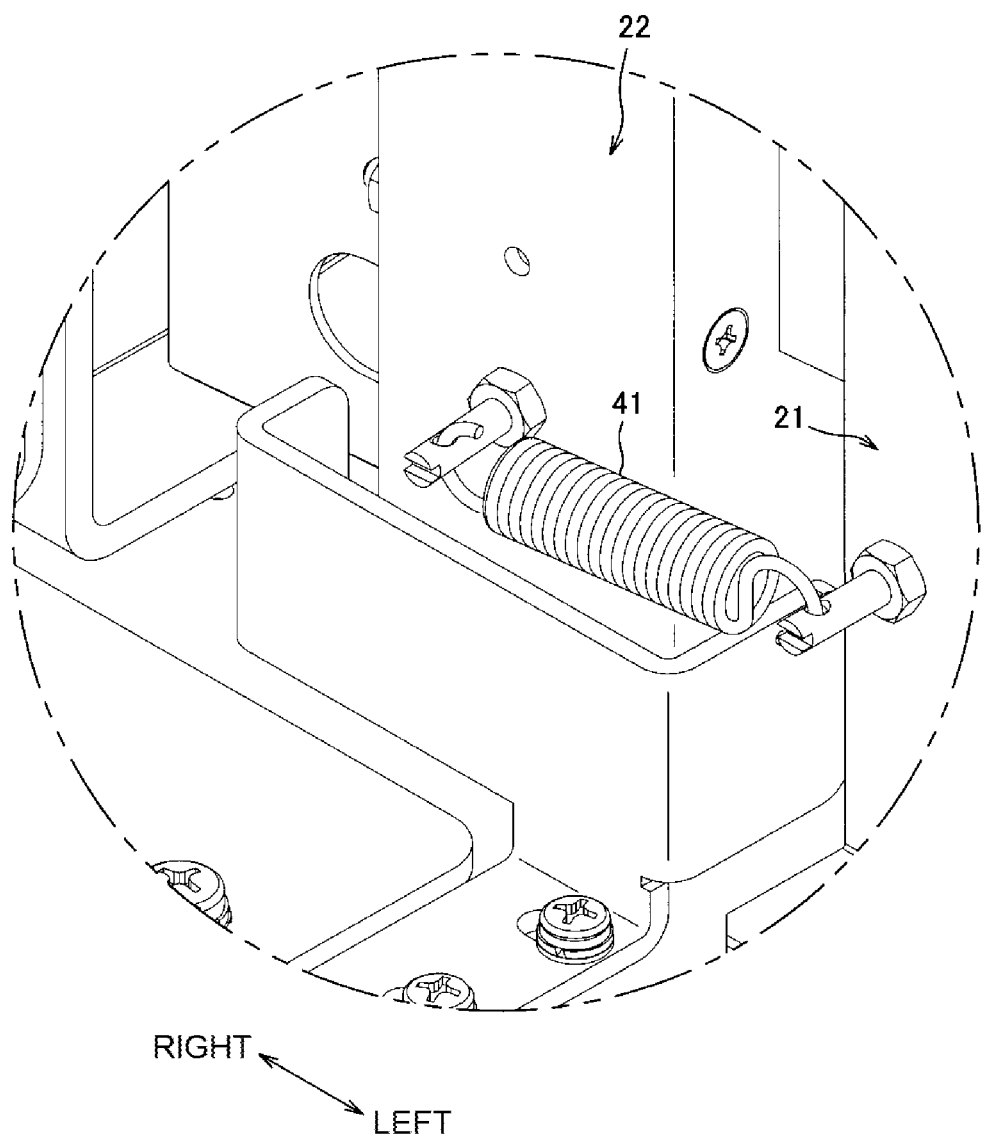
FIG. 9 is an enlarged view of the section D in FIG. 4.

FIG. 9 is an enlarged view of the section D in FIG. 4. As is shown in FIG. 5 and FIG. 9, the one end (right end) side of the rear coil spring 41 is connected to the rear end side of the movable detecting unit 22 as a movable end. While, the other end (left end) side of the rear coil spring 41 is connected to the rear end side of the fixed detecting unit 21 as a fixed end. The rear coil spring 41 exhibits a force pulling the rear end of the movable detecting unit 22 in a direction to come close to the fixed detecting unit 21, i.e. leftward. This applies a force to the movable detecting unit 22 for rotatively displacing the movable detecting unit 22 counterclockwise in FIG. 5 to result in a state in which the movable detecting unit 22 is energized in the direction to narrow the lateral width on the back of the insertion space 26. The rear coil spring 41 is, in the initial state shown in FIG. 5, is set to be energized to exert a force with a degree with which the contact between the limiter 43 and the movable detecting unit 22 by the front coil spring 40 is maintained.

As is shown in FIG. 1, the movable detecting unit 22 is provided so as to be positioned toward inside at a certain distance away from the side wall on the right side in the right side compartment 18b.

Figure 10:
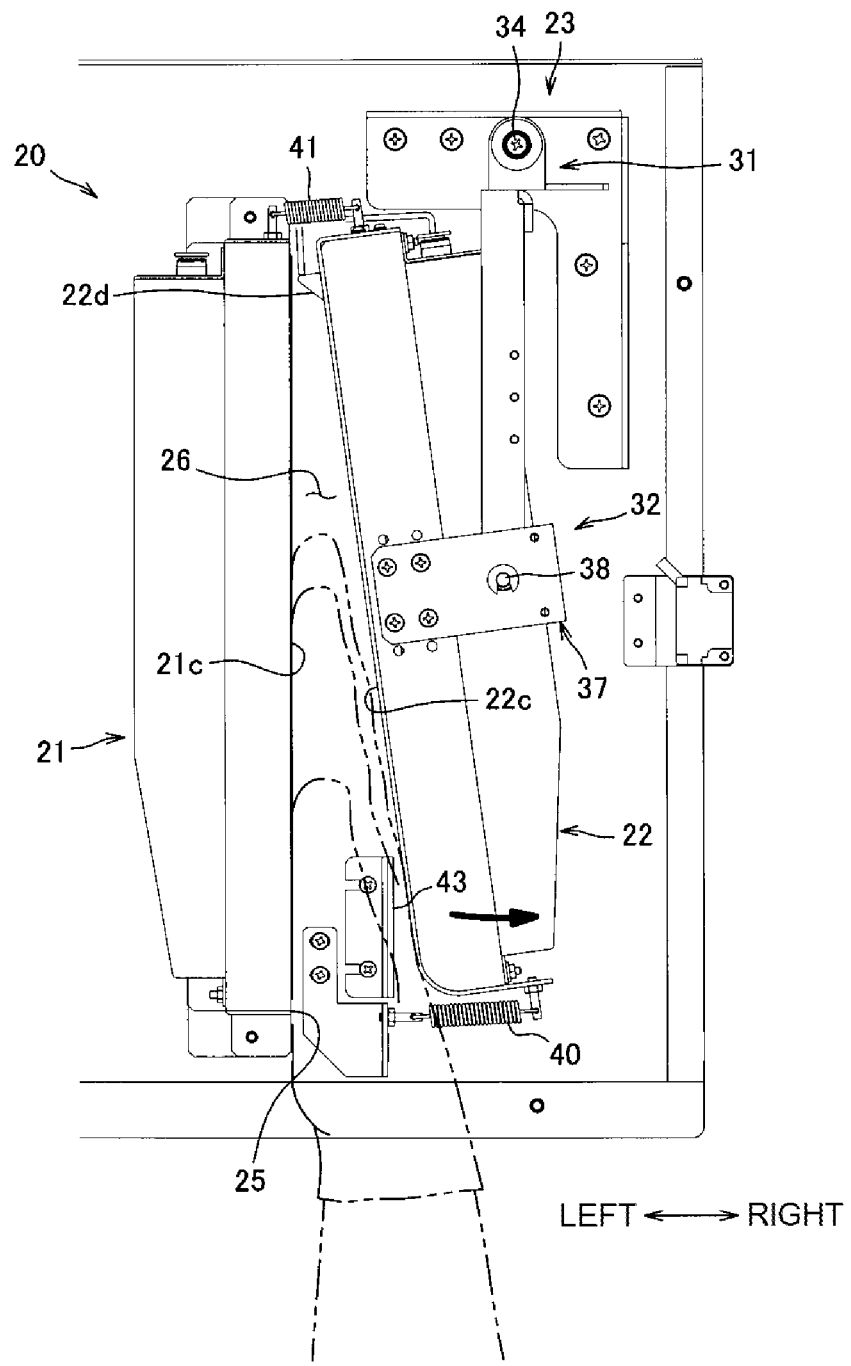
FIG. 10 is a plan view explaining the operation of the hand monitoring section in the course of insertion of the hand of the subject.
Figure 11:
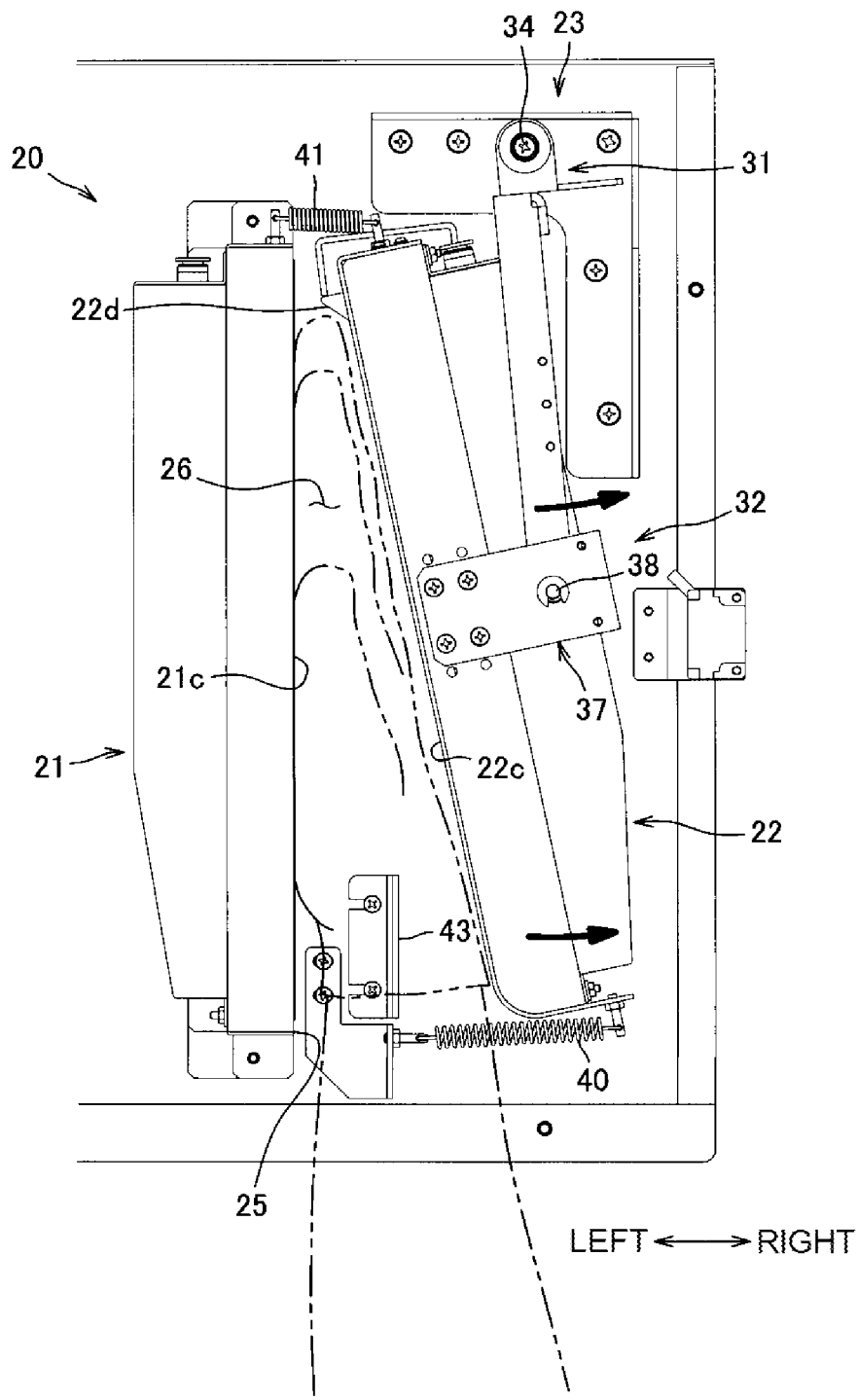
FIG. 11 is a plan view explaining the operation of the hand monitoring section at the step of measuring radioactive rays from the hand of the subject.

Next to this, the operation at the measurement of the surface contamination in the hand monitoring section 20 according to the embodiment will be explained with reference to FIG. 10 and FIG. 11. FIG. 10 is a plan view explaining the operation of the hand monitoring section 20 at the step in the course of insertion of the hand of the subject. FIG. 11 is a plan view explaining the operation of the hand monitoring section 20 at the step of measuring radioactive rays from the hand of the subject. The explanation of the following operation is that with respect to one example. Some sizes or shapes of hands will therefore result in different operations.

From the initial state shown in FIG. 5, the hand of the subject is inserted into the insertion space 26 through the insertion opening 25 as is shown in FIG. 10. At this time, the palm of the hand is made to come into contact with the inner surface of the fixed detecting unit 21 while being made to face the fixed detecting unit 21 and the back of the hand is made to come into contact with the inner surface of the movable detecting unit 22 while being made to face the movable detecting unit 22. When the hand is made to be further inserted into the insertion space 26, the hand, having the thickness thereof increasing from the fingertip toward the wrist, exerts a force increasing the lateral width of the insertion opening 25 on the movable detecting unit 22 by the back of the hand. Then, the movable detecting unit 22 is rotatively displaced counterclockwise with the coupling units 38 in the second displacing unit 32 centered as is shown by a thick arrow in FIG. 10 to move apart from the limiter 43. At this time, the energizing force of the front coil spring 40 is exerted on the movable detecting unit 22 against the rotative displacement thereof so as to narrow the lateral width of the insertion opening 25, by which the inside surface of the movable detecting unit 22 is pressed against the back of the hand while the detection window 22c is being rotated so as to become in parallel with the back of the hand. This can also press the palm against the inside surface of the fixed detecting unit 21, by which both of the detection windows 21c and 22c can be brought into intimate contact with the palm and the back of the hand, respectively.

Following this, the hand is made to be further inserted into the insertion space 26 from the initial state shown in FIG. 10 to make the fingertip come into contact with the stopper 22d or positioned in proximity thereto as is shown in FIG. 11. Then, the back of the hand exerts a force that further increases the lateral width of the insertion opening 25. At this time, the movable detecting unit 22, while being rotatively displaced counterclockwise as is shown in FIG. 10 with the coupling unit 38 of the second displacing unit 32 centered, is further displaced with a turn so as to be shifted rightward with the rotation support 34 of the first displacing unit 31 centered. That is, by the turn of the first displacing unit 31, the movable detecting unit 22 is displaced in the direction of the thickness of the hand. At the same time, by the rotation of the second displacing unit 32, the movable detecting unit 22 is displaced so as to become in parallel with the back of the hand. The displacements are carried out against the energized forces of both of the front coil spring 40 and rear coil spring 41. With this, while the state in which the detection window 22c becomes in parallel with the back of the hand is being maintained, the inside surface of the movable detecting unit 22 is pressed against the back of the hand on both of the fingertip side and the wrist side thereof. By the movable detecting unit 22 pressing the back of the hand in this way, the palm can be also pressed against the inside surface of the fixed detecting unit 21 to enable both of the detection window 21c and the detection window 22c to be brought into intimate contact with the palm and the back of the hand, respectively.

As is explained in the foregoing, according to the embodiment, when inserting a hand from the insertion opening 25, the inserted hand displaces the movable detecting unit 22 against the force exerted by each of the front coil spring 40 and the rear coil spring 41 to enable the movable detecting unit 22 to be brought into intimate contact with the back of the hand. This can bring the fixed detecting unit 21 close to the palm and bring the movable detecting unit 22 close to the back of the hand to the size of the hand of the subject, by which even α rays with short ranges can be accurately measured.

Moreover, the front coil spring 40 and the rear coil spring 41, being provided in front of the movable detecting unit 22 and in the rear thereof, respectively, as energizing elements, can apply energizing forces to the hand on both of the fingertip side and the wrist side thereof, by which enhanced tightness can be provided in the intimate contact between the hand and each of the detection window 21c and the detection window 22c.

Incidentally, the working-effect of the embodiment will be examined by comparing the structure of the embodiment with first to third comparative structures explained in the following. First, as a first comparative structure, a structure is assumed in which the movable detecting unit 22 is displaced only by the second displacing unit 32 without the displacement carried out by the first displacing unit 31. In the structure, for making the structure comply with the subjects having hands with various sizes, the lateral widths of the insertion opening 25 and the insertion space 26 are set largely. This is to cause the tightness in the intimate contact between the hand and the detection window 22c to be more degraded as the size of the hand becomes smaller.

In this point, in the structure of the embodiment, the displacement by the first displacing unit 31 enables the movable detecting unit 22 to be displaced in the thickness direction of the hand (lateral direction) in compliance with various sizes of hands, which makes it possible to improve the tightness in the intimate contact.

As a second comparative structure, a structure is assumed in which the movable detecting unit 22 is displaced only by the first displacing unit 31 without the displacement carried out by the second displacing unit 32. In the structure, the movable detecting unit 22 is laterally displaced with little change in the angle between the detection window 21c and the detection window 22c. Therefore, some angles between the back of the hand and the fixed detecting unit 21 cause either one of the section on the wrist side or the section on the fingertip side to be separated from the detection window 22c, which is to degrade the tightness in the intimate contact between the hand and the detection window 22c.

In this point, in the structure of the embodiment, the displacement by the second displacing unit 32 enables the movable detecting unit 22 to be rotatively displaced so as to become in parallel with the back of the hand in compliance with various angles between the backs of hands and the fixed detecting unit 21, which makes it possible to improve the tightness in the intimate contact.

As a related structure to be a third comparative structure, there is a structure with a type in which a hand is inserted between a pair of detecting units before pressing a button with the bottom surface of the hand (the surface on the little finger side) to thereby displace the detecting units so as to come close to each other. With the structure of this type, the bottom surface of the hand made to come into contact with the button is masked by the button to sometimes degrade detection accuracy of radioactive rays emitted from radioactive materials attracted to the bottom surface of the hand.

In this point, in the embodiment, the movable detecting unit 22 is made to come close to the fixed detecting unit 21 by the front coil spring 40 and the rear coil spring 41. Therefore, the bottom surface of the hand can be brought into noncontact with a masking object such as a button, which can avoid degradation in detection accuracy of radioactive rays.

The invention can be brought into practice with various modifications without being limited to the foregoing embodiment. Moreover, there are no particular limitations with respect to the numerical values, sizes, materials and directions which are explained in the foregoing embodiment. In addition, the invention can be modified as required without departing from the scope of the object of the invention.

For example, a structure may be provided so that both of the fixed detecting unit 21 and the movable detecting unit 22 detecting the palm side and the back side of the hand, respectively, are made to be displaceable. In this case, the fixed detecting unit 21 is made to be also movable and the displacing mechanism 23 is made to have a structure in which another displacing mechanism is additionally provided on the side of the fixed detecting unit 21 with the foregoing structure of the displacing mechanism 23 symmetrically reversed in the lateral direction and is connected to the fixed detecting unit 21 made to be displaceable. In addition, the two detecting units 21 and 22 arranged oppositely to each other may be provided so that only the detecting unit detecting the palm side is displaceable. In other words, the relation in which the fixed detecting unit 21 is referred to as the first detecting unit and the movable detecting unit 22 is referred to as the second detecting unit may be reversed.

The structure of the displacing mechanism 23 can be variously modified so far as it is able to function like the displacing mechanism 23 in the foregoing embodiment. For example, the first displacing unit 31 may be modified so as to be formed by a slider that displaces the movable detecting unit 22 in the direction of the thickness of a hand or so as to have a structure that makes use of the slider. In addition, the position of the bracket 37 provided with the coupling units 38 as the center of the relative rotation of the second displacing unit 32 can be changed so as to be shifted onto the rear end side of the movable detecting unit 22.

Moreover, for the energizing elements, instead of the front coil spring 40 and rear coil spring 41, springs such as leaf springs, coned disk springs or special springs can be used. In addition, the energizing elements can be changed to other elastic bodies energizing the movable detecting unit 22 in a direction to bring the movable detecting unit 22 to come close to the fixed detecting unit 21. Furthermore, the positions to which the front coil spring 40 and the rear coil sprig 41 are connected, respectively, are not limited to the positions explained in the foregoing embodiment. For example, in the front coil spring 40, the end connected to the support 42 can be connected to the fixed detecting unit 21 without being connected to the support 42. In addition, the rear coil spring 41 can be omitted so far as the movable detecting unit 22 is able to function in the same way as that in the foregoing embodiment.

What is claimed is:

1. In a radiation monitor for detecting radioactive surface contamination, comprising:
a first detecting unit detecting radioactive rays;
a second detecting unit detecting radioactive rays while being arranged oppositely to the first detecting unit, the first detecting unit and second detecting unit forming between them an insertion opening and an insertion space connected to the insertion opening into which a subject inserts a hand having a palm and a back; and
a displacing mechanism that is connected to the first detecting unit and the second detecting unit and that is configured to displace the first detecting unit and the second detecting unit relatively to each other by a distance when the hand of the subject is inserted through the insertion opening into the insertion space, and
detecting radioactive rays emitted from radioactive materials attracted to the hand of the subject with one of the palm and the back of the hand being made to face the first detecting unit and another of the palm and the back of the hand being made to face the second detecting unit,
the improvement comprising:
at least one energizing element that energizes at least one of the first detecting unit and second detecting unit in a direction promoting relatively close proximity to one another,
wherein the displacing mechanism comprises a first displacing unit and a second displacing unit, the first displacing unit displacing at least one of the first detecting unit and the second detecting unit in the direction of the thickness of the hand of the subject, and the second displacing unit displacing the at least one of the first detecting unit and the second detecting unit so as to become in parallel with one of the palm and the back of the hand of the subject.

2. The radiation monitor as claimed in claim 1, wherein the first detecting unit is provided as a fixed detecting unit and the second detecting unit is provided as a movable detecting unit.

3. The radiation monitor as claimed in claim 2, wherein the displacing mechanism displaces the movable detecting unit by the action of the hand of the subject inserted into the insertion opening.

4. The radiation monitor as claimed in claim 2, wherein each of the fixed detecting unit and movable detecting unit is vertically arranged and is provided with a detection window on respective vertical surfaces thereof on a respective side facing the insertion space.

5. The radiation monitor as claimed in claim 2, wherein the energizing element comprises a spring having a fixed end coupled to the fixed detecting unit and a movable end coupled to the movable detecting unit.

6. The radiation monitor as claimed in claim 2, further comprising a limiter that limits displacement of the movable detecting unit by the energizing element in a stand-by state for detecting radiation, the limiter enabling width of the insertion opening to be kept constant in the stand-by state by limiting the displacement of the movable detecting unit.

7. The radiation monitor as claimed in claim 6, wherein the movable detecting unit moves apart from the limiter when the hand of the subject is inserted through the insertion opening.

8. The radiation monitor as claimed in claim 2, wherein the energizing element energizes at least one of the first detecting unit and the second detecting unit on each of an insertion opening side and a side opposite the insertion opening.

9. The radiation monitor as claimed in claim 2, wherein the energizing element energizes at least one of the first detecting unit and the second detecting unit on an insertion opening side of the insertion opening.

10. The radiation monitor as claimed in claim 2, wherein the second displacing unit is provided with a coupling unit that couples the first displacing unit and at least one of the first detecting unit and the second detecting unit so that relative rotation between the first detecting unit and the second detecting unit is made possible.

11. The radiation monitor as claimed in claim 10, wherein the first displacing unit is provided with a rotation support that turns at least one of the first detecting unit and the second detecting unit.

12. The radiation monitor as claimed in claim 2, wherein the first displacing unit is provided with a rotation support that turns at least one of the first detecting unit and the second detecting unit.

13. The radiation monitor as claimed in claim 1, wherein the energizing element energizes at least one of the first detecting unit and the second detecting unit on each of an insertion opening side and an opposite side of the insertion opening.

14. The radiation monitor as claimed in claim 1, wherein the energizing element energizes at least one of the first detecting unit and the second detecting unit on an insertion opening side of the insertion opening.

15. The radiation monitor as claimed in claim 1, wherein the second displacing unit is provided with a coupling unit that couples the first displacing unit and at least one of the first detecting unit and the second detecting unit so that relative rotation between the first detecting unit and the second detecting unit is made possible.

16. The radiation monitor as claimed in claim 1, wherein the first displacing unit is provided with a rotation support that turns at least one of the first detecting unit and the second detecting unit.

17. A hand-foot-and-cloth monitor, comprising:
   a hand monitor section having the radiation monitor as claimed in claim 1;
   a foot monitor section detecting the surface contamination of the foot of the subject; and
   a cloth monitor section detecting the surface contamination of the cloth of the subject.

18. In a radiation monitor for detecting radioactive surface contamination, comprising:
   a first detecting unit detecting radioactive rays;
   a second detecting unit detecting radioactive rays while being arranged oppositely to the first detecting unit, the first detecting unit and second detecting unit forming between them an insertion opening and an insertion space connected to the insertion opening into which a subject inserts a hand having a palm and a back; and
   a displacing mechanism connected to the first detecting unit and the second detecting unit, configured to displace the first detecting unit and the second detecting unit relatively to each other by a distance when the subject inserts the hand thereof through the insertion opening into the insertion space, and
   detecting radioactive rays emitted from radioactive materials attracted to the hand of the subject with one of the palm and the back of the hand being made to face the first detecting unit side and another of the palm and the back of the hand being made to face the second detecting unit side,
   the improvement comprising:
   at least one energizing element that moves at least one of the first detecting unit and second detecting unit into close proximity to one another upon insertion of the hand of the subject,
   wherein the displacing mechanism comprises a first displacing unit and a second displacing unit, the first displacing unit displacing at least one of the first detecting unit and the second detecting unit in the direction of the thickness of the hand of the subject, and the second displacing unit displacing the at least one of the first detecting unit and the second detecting unit so as to become in parallel with one of the palm and the back of the hand of the subject.

* * * * *